March 14, 1950     M. D. BEEM     2,500,744
INVALID'S BED
Filed Aug. 19, 1946     8 Sheets-Sheet 3
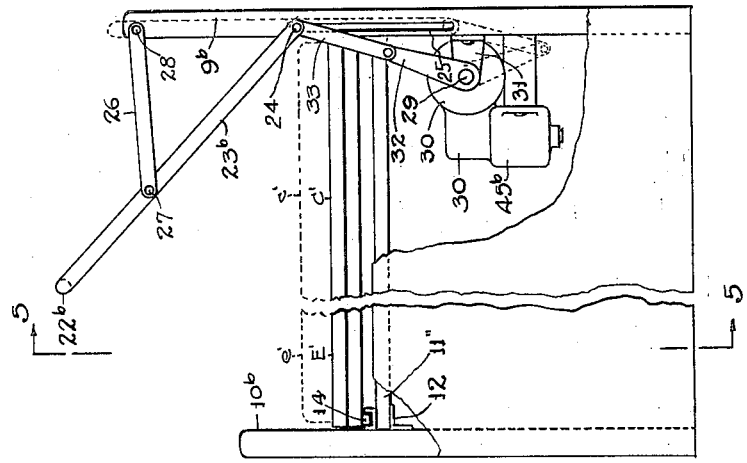
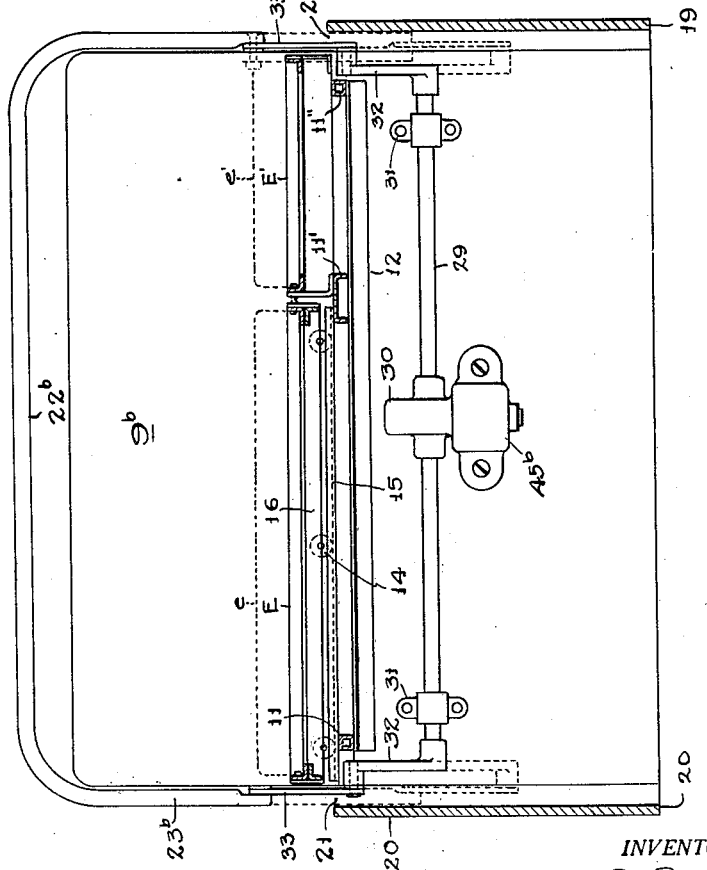
INVENTOR.
MARVEL D. BEEM
BY Lynn Latta
ATTORNEY

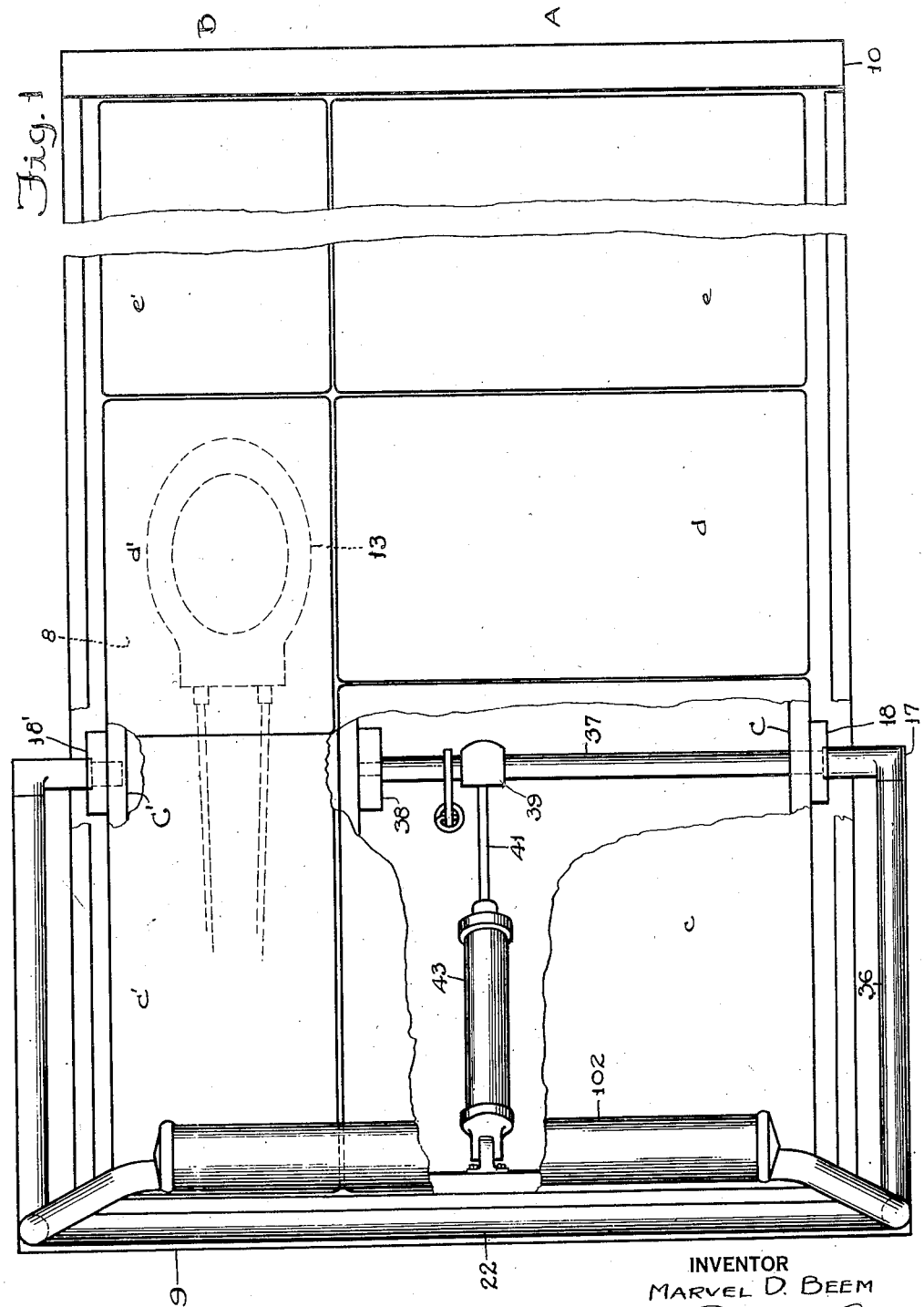

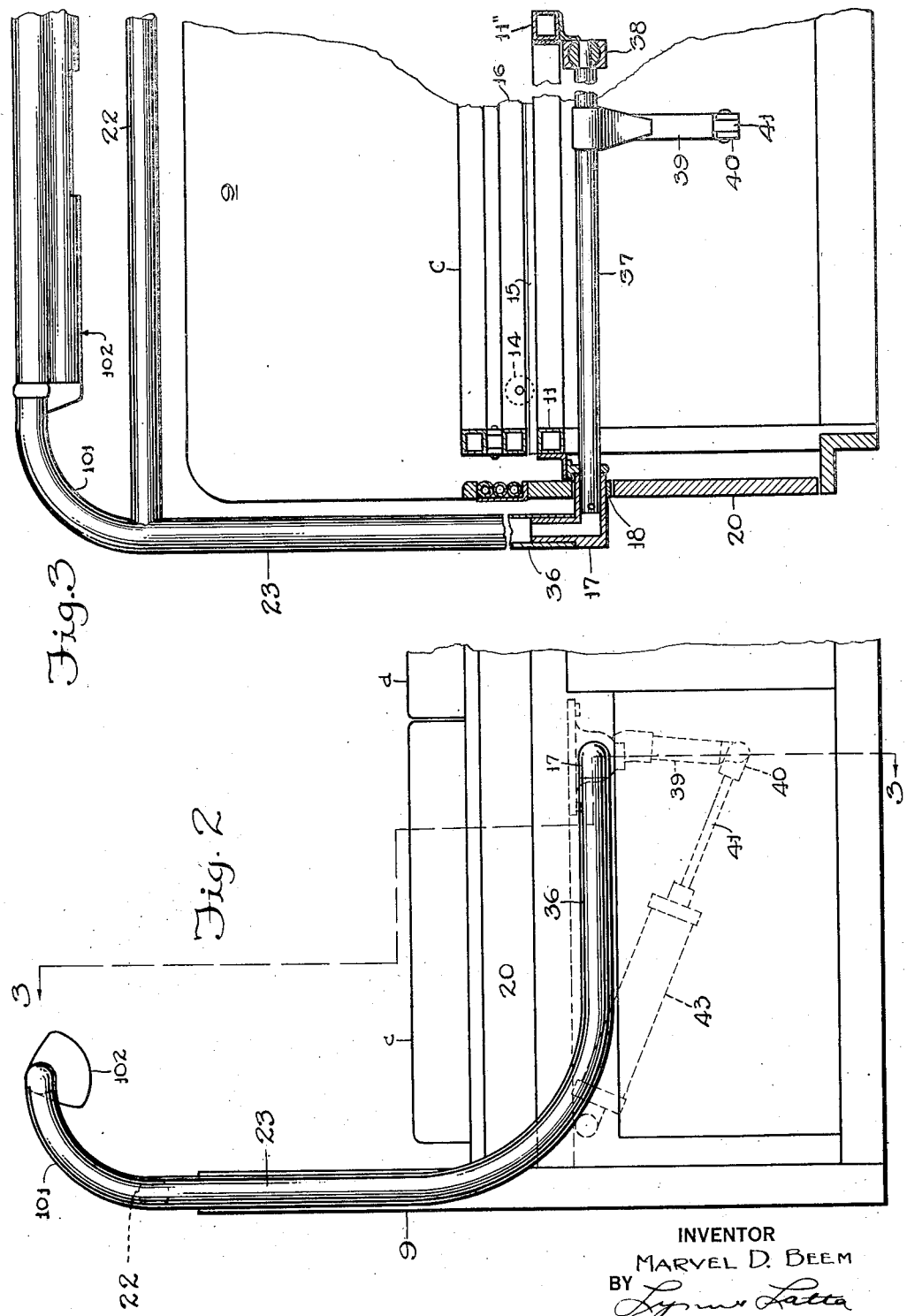

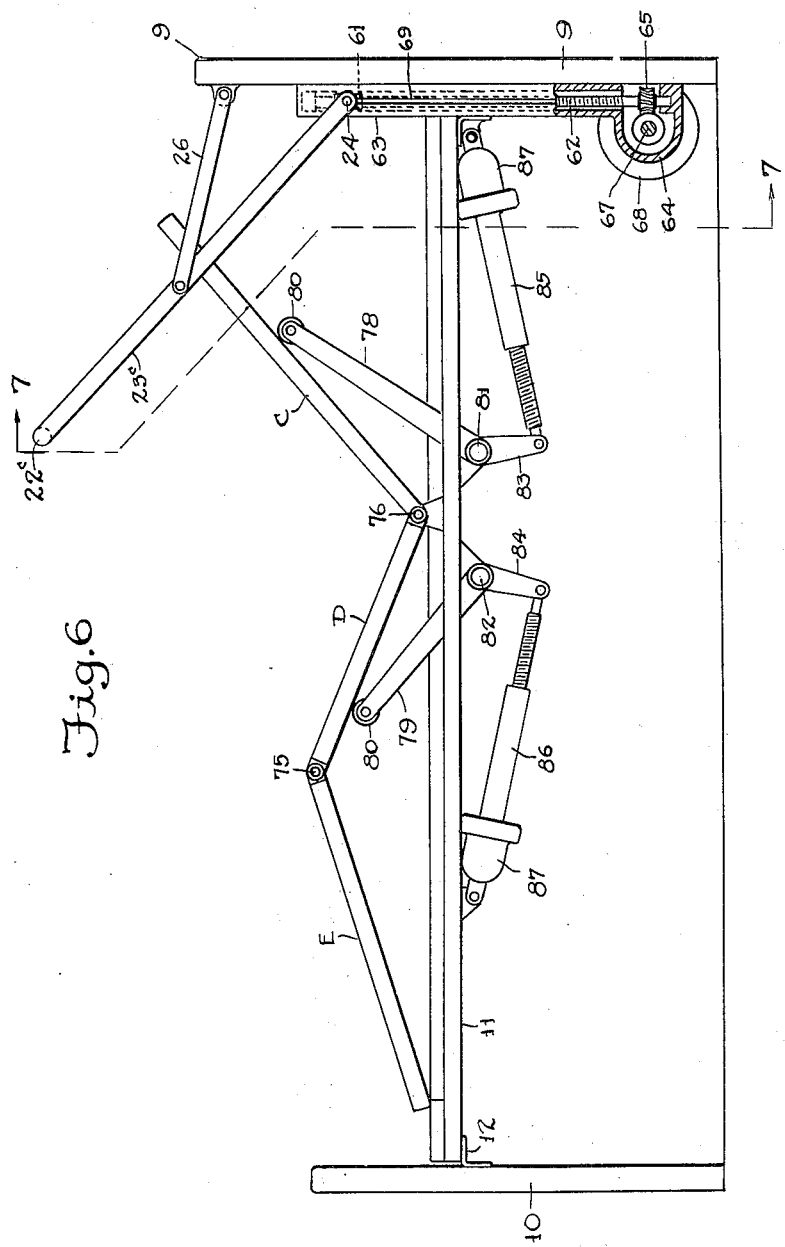

March 14, 1950  M. D. BEEM  2,500,744
INVALID'S BED

Filed Aug. 19, 1946  8 Sheets-Sheet 5

INVENTOR.
MARVEL D. BEEM
BY Lynn Latta
ATTORNEY

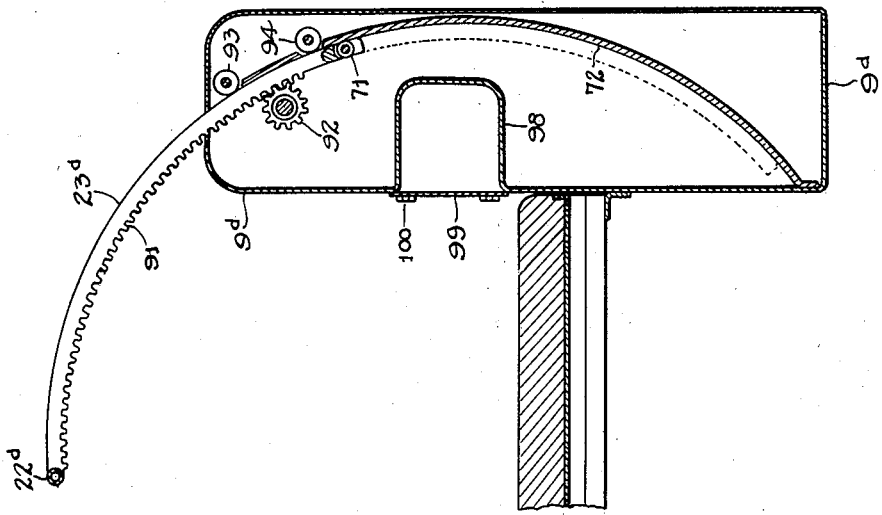
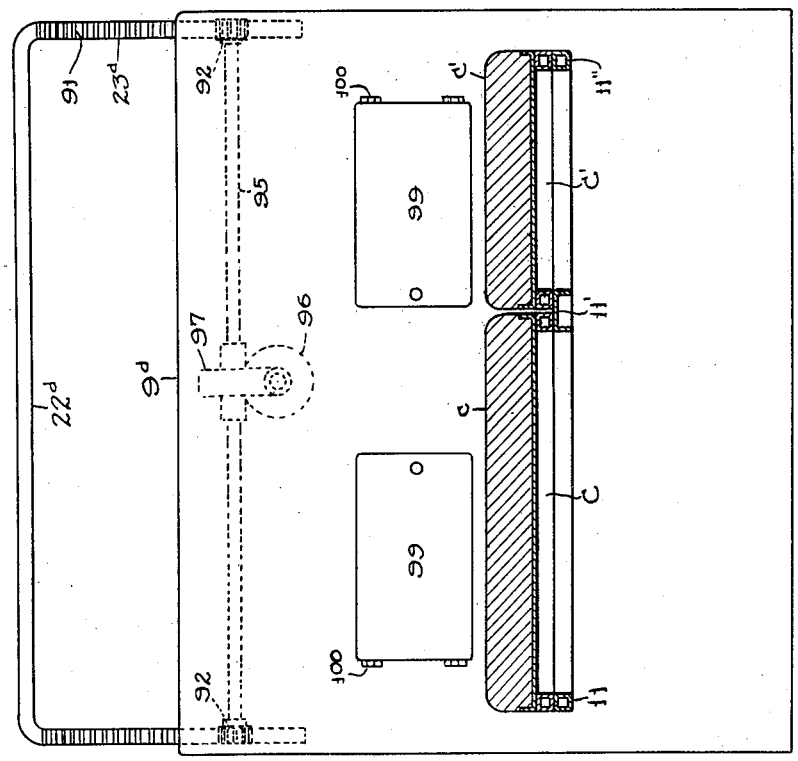

March 14, 1950      M. D. BEEM      2,500,744
INVALID'S BED

Filed Aug. 19, 1946      8 Sheets-Sheet 7

INVENTOR
MARVEL D BEEM
BY Lynn Latta
ATTORNEY

INVENTOR.
MARVEL D. BEEM

Patented Mar. 14, 1950

2,500,744

UNITED STATES PATENT OFFICE 2,500,744

INVALID'S BED

Marvel D. Beem, Los Angeles, Calif., assignor of one-half to The Beem Foundation, Los Angeles, Calif., a charitable trust of California Application August 19, 1946, Serial No. 691,491

17 Claims. (Cl. 5—317)

This invention relates to invalid's beds of a type shown in my pending application, Serial No. 613,985, in which a flushable toilet is incorporated in one side of a bed. The present application constitutes in part a continuation of said pending application. The general object of the invention is to provide an invalid's bed in which the patient may move himself from the normal resting area of the bed to the toilet seat area of the bed and vice versa, without the assistance of a nurse.

A major item of expense in a hospital or in a nursing home is the nursing labor required for attending to the ordinary needs of the patient. The use of a bed pan requires considerable time and effort on the part of a nurse in lifting the patient on and off the pan. Proposals have heretofore been made to provide an invalid's bed in which a bed pan or toilet would be arranged to cooperate with an opening in the bed so as to make it unnecessary to lift the patient. However, such proposals have contemplated the location of the bed pan or toilet in the center of the bed, with the result that the patient would be forced to rest and sleep directly over the toilet opening, a definitely undesirable characteristic.

My invention contemplates arranging the toilet mechanism at one side of the bed so as to leave the major area of the bed on the other side thereof, substantially unbroken so as to provide a comfortable, normal type of resting surface. Such an arrangement, however, requires a shifting of the patient from the normal resting area of the bed to the toilet seat area of the bed, and in order to avoid the necessity for assistance from a nurse in shifting from one side to the other, the invention contemplates the combination, with this general arrangement of normal resting area and toilet mechanism on respective sides of the bed, of a trapeze mechanism extending transversely of the bed and adapted to be utilized by the patient in shifting back and forth from one side to the other. This combination of trapeze mechanism with a bed having a flushable toilet and a toilet seat restricted to one side of the bed, and with the toilet seat in substantially the same plane with, and forming a continuation of the normal resting surface, has solved the problem of providing an invalid's bed in which a patient may take care of his needs without the assistance of a nurse.

Other objects of the invention are: to provide an invalid's bed having a permanently associated trapeze which is normally in an inoperative position, out of the way; to provide an invalid's bed having a trapeze which is normally associated with the head of the bed, and is movable from this position to a position projected toward the foot of the bed and spaced above the bed; to provide an invalid's bed having a trapeze mechanism including motor driven means for shifting the trapeze from its inoperative position to its operative position and vice versa; to provide an invalid's bed in which the trapeze, in its inoperative position, does not obstruct the space above the bed and therefore does not hinder the efforts of a nurse in changing the bed clothing, attending to the patient, etc.; to provide an invalid's bed having a trapeze mechanism which, in addition to its primary function as a trapeze, has the secondary function of supporting a bed lamp in a desirable position; and to provide an invalid's bed equipped with a bed lamp unit which incorporates both a reading light and a source of ultraviolet light.

Other objects will become apparent in the ensuing specifications and appended drawings in which:

Fig. 1 is a plan view of an invalid's bed embodying the invention, parts thereof being broken away to better illustrate the trapeze mechanism;

Fig. 2 is a side elevation of the head end of the bed, showing the trapeze mechanism;

Fig. 3 is a transverse sectional view of portions of the bed taken as indicated by the line 3—3 of Fig. 2;

Fig. 4 is a side view of the respective end portions of an invalid's bed embodying a modified form of the invention;

Fig. 5 is a transverse sectional view of the same taken on the line 5—5 of Fig. 4;

Fig. 6 is a side elevation of an invalid's bed embodying another modification of the invention;

Fig. 9 is a longitudinal sectional view of one end portion of a bed embodying another modification of the invention;

Fig. 10 is a transverse sectional view of the bed shown in Fig. 9;

Figure 7:
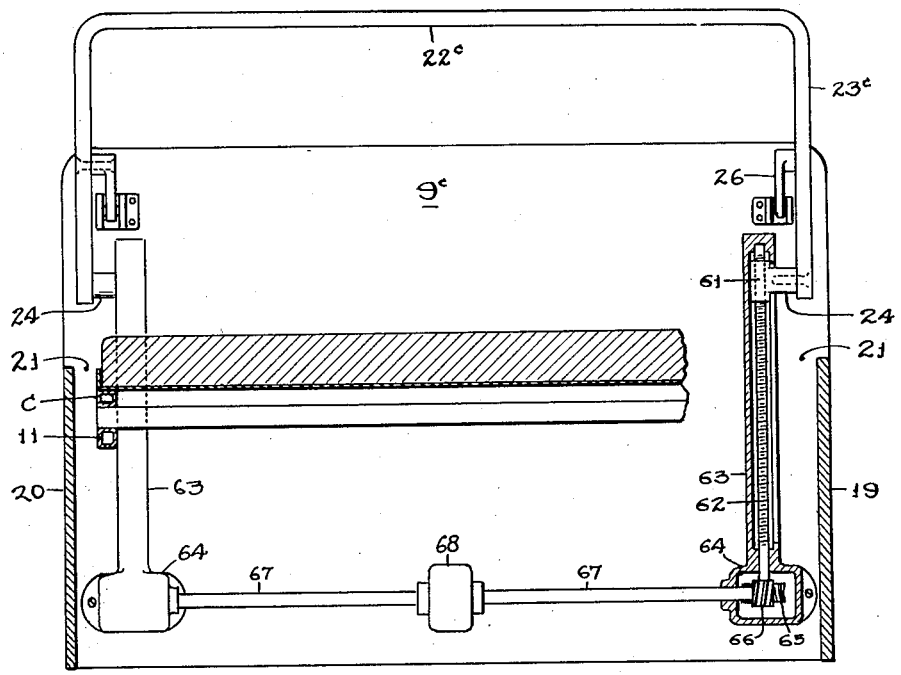
Fig. 7 is a transverse sectional view of the bed shown in Fig. 6 taken on the line 7—7 of Fig. 6.

In general, my invention is embodied in a hospital bed having a head 9, a foot 10, and a bed bottom which is arranged to provide a normal resting area A and a toilet seat area B, the areas A and B extending from the head to the foot of the bed, the area A occupying a major portion of the width of the bed on one side thereof, and the area B occupying a minor portion of the area of the bed on the other side thereof. The portion A of the bed bottom is subdivided into three inclinable sections thereof, shown at c, d and e, and the toilet portion B of the bed is likewise subdivided into three sections, corresponding to the mattress sections c', d' and e' thereof. Where these various bed bottom sections appear in the drawings, they are indicated by the reference characters C, D, E, C', D' and E', corresponding respectively to the mattress sections, c, d, e, c' and e'. These bed bottom sections are adapted to occupy positions disclosed, in a common plane or to be elevated to reclining seat positions as shown in Fig. 6. The section D' is formed to provide an opening 8 with which a toilet, indicated in dotted lines at 13 in Fig. 1, is adapted to cooperate. The toilet is provided with mechanism for elevating it from an inoperative position beneath the bed to a position cooperating with the opening 8, and suitable means is provided for raising a cover for the opening 8 and with it, the mattress section d' so as to uncover this opening and provide for the toilet 13 being presented for use.

The supporting structure of the bed includes a number of fixed longitudinal rails such as the rails shown at 11, 11' and 11'' in Fig. 5. These rails are suitably secured, as at 12, to the head and foot of the bed. The normal resting portion of the bed bottom is supported upon a sub frame 16 through the medium of rollers 14 traveling in transverse tracks 15 secured to the rails 11 and 11'. This permits the entire normal resting portion of the bed to be shifted laterally, as a unit, from the bed onto an ambulating cart for transporting the patient from the bed to other parts of a hospital.

Side panels 19 and 20 connect the head 9 and foot 10 to form a cabinet structure beneath the bed bottom, within which the operating mechanism of the bed is contained. The panels 19 and 20 are spaced from the rails 11, 11'' and from the side extremities of the bed bottom sections, to provide spaces 21 through which the trapeze mechanism may operate.

The trapeze of Figs. 1-3 comprises an inverted U-shaped yoke, preferably of tubular material, having a horizontal hand bar 22, a pair of normally vertical side arms 23, and a pair of normally horizontal side arms 36. In a normal, inoperative postion of the trapeze, shown in Fig. 2, the hand bar 22 extends directly over the head 9 of the bed, the vertical side arms 23 embrace the side edges of the head 9, and the horizontal side arms 36 extend alongside the panels 19 and 20, below the level of the bed bottom and mattress sections. The end of one of the side arms 36 is attached, by means of a fitting 17, to a transverse shaft 37 which is journaled in bearings 38 and 18 supported by the rail members 11 and 11' respectively. The shaft 37 extends only beneath the normal resting area A of the bed, in order to avoid interference with the elevating mechanism for the toilet 13, and the trapeze arm 36 on the toilet side of the bed is directly journaled in a bearing 18'. The bearing 38 is shown as a self-aligning bearing, to avoid binding of the shaft 37 in its bearings.

Operating mechanism for the trapeze includes a crank arm 39 secured to the shaft 37 and extending downwardly, and a motor unit which may be of a hydraulic type as shown in Fig. 2, including a shaft 41 pivoted at 40 to the arm 39 and a hydraulic cylinder 43 in which a piston on the end of the shaft 41 operates. Suitable hydraulic connections (of a conventional nature and therefore not shown) may be utilized for actuating the motor 41, 43. As the shaft 41 is drawn into the cylinder 43, the trapeze will be swung in a clockwise direction as viewed in Fig. 2, about the axis of the bearings 18, 38, bringing the bar 22 forwardly and upwardly to a position traversing the bed above the forward area of the back rest sections C and C' of the bed bottom. This makes it possible for the patient to grasp the bar 22, and to lift himself sufficiently to move transversly in the bed from the normal resting portion A to the toilet seat portion B and vice versa. The motor 41, 43 and arm 39 are disposed substantially centrally between the remote sides of the bed in order to properly center the application of power between the respective sides of the trapeze.

The side arms 23 are continued above the trapeze bar 22, as at 101. Carried by the ends of the arm portions 101, which are curved forwardly as shown in Fig. 2, is a bed lamp which is indicated generally at 102. This bed lamp is shown in detail in Figs. 11 to 14 inclusive, and will be described in detail hereinafter.

Figure 8:
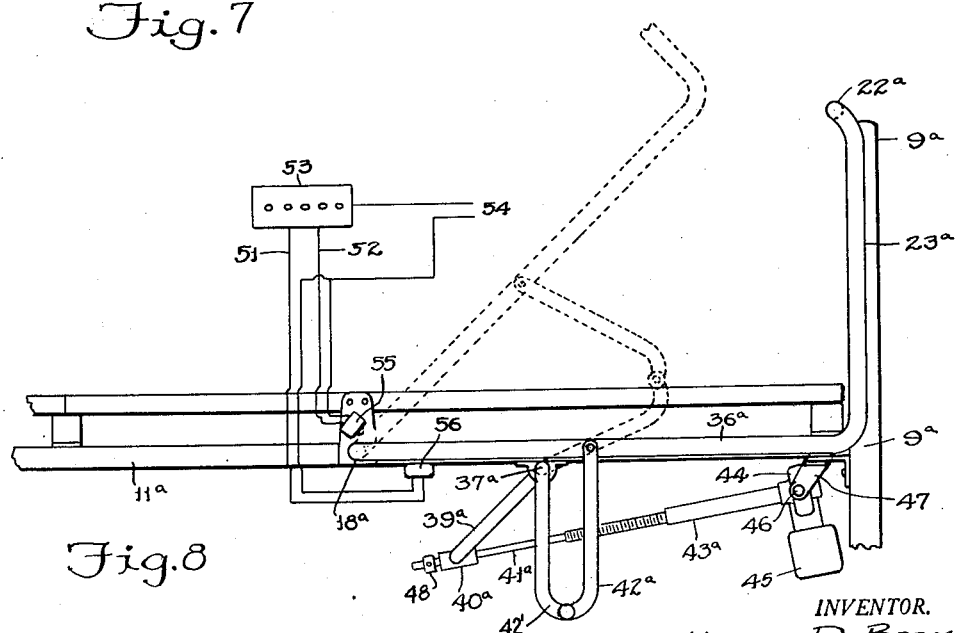
Fig. 8 is a schematic view of another modified form of the invention.
Figure 14:
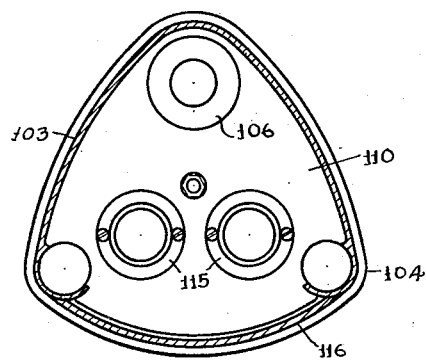
Fig. 14 is a transverse sectional view of the bed lamp taken on the line 14—14 of Fig. 11.
Figure 12:
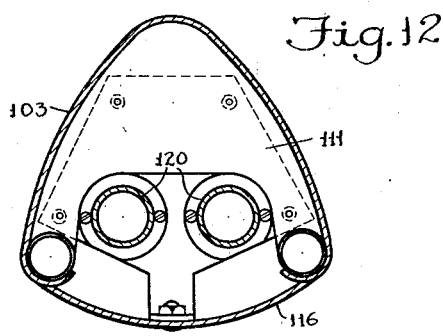
Fig. 12 is a transverse sectional view of the bed lamp taken on the line 12—12 of Fig. 11.
Figure 13:
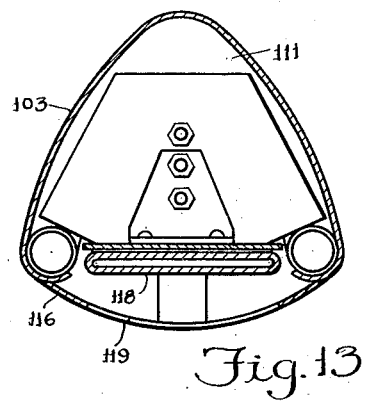
Fig. 13 is a transverse sectional view of the bed lamp taken on the line 13—13 of Fig. 11.
Figure 11:
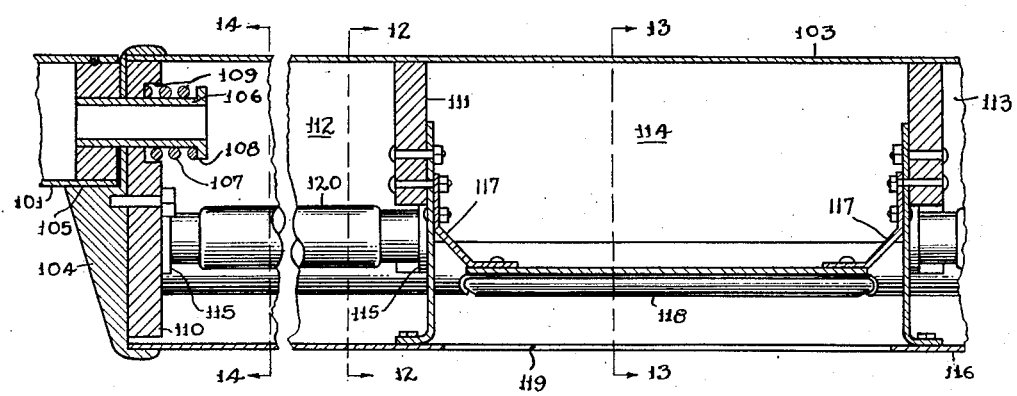
Fig. 11 is a longitudinal sectional view through portions of the bed lamp of Figs. 1, 2 and 3.

Fig. 8 shows a somewhat modified form of the trapeze of Figs. 1, 2 and 3, in schematic form. Fig. 8 also illustrates electrical mechanism for operating the trapeze, together with means for automatically cutting off the power at the respective limits of trapeze movement. Parts that are similar to those shown in Figs. 1 to 3 are indicated by corresponding reference numerals, with the letter "a" appended. The elevated position of the trapeze is shown in dotted lines. The power mechanism includes a sleeve 40a which is pivoted to a lower end of the arm 39a. Loosely extending through the sleeve 40a is a threaded rod 41a which is secured to its end a stop collar 48 that engages the sleeve 40a for transmitting elevating movement to the trapeze. In the retracting operation, the trapeze moves downwardly by gravity, following the movement of the shaft 41a but is not positively moved thereby. Consequently, in the event a patient or tenant should have a limb caught between the trapeze and the head of the bed, the pressure exerted would be only the weight of the trapeze and would not be great enough to result in injury. The shaft 41a forms a part of a screw jack including an internally threaded sleeve 43a into which the shaft 41a is threaded, reduction gearing 44, and an electric motor 45 for driving the reduction gearing 44. The reduction gearing 44 and motor 45 are pivoted at 46 in a bracket 47 on the head 9 of the bed. The motor 45 is a reversible motor, and its operation in one direction will raise the trapeze to the operative, dotted line position, while operation in the other direction will return the trapeze to its lowered inoperative position, shown in full lines.

Forward and reverse circuits 51 and 52 respectively, for energizing the motor 45, are controlled through push button switches in a control box 53. A suitable source of electric current is indicated at 54. When the trapeze arrives at its upper limit of movement, the circuit 52 will be broken by the engagement by an arm 36a with a limit switch 55, which is in the circuit 52. When the trapeze, in its return movement, reaches its lowered position, the circuit 51 will be broken by the engagement, by an arm 36a with a limit switch 56 which is in the circuit 51.

A pair of arms 42a and 42', pivoted to each other, are connected to the shaft 37a and arms 36a respectively.

Another arrangement embodying the principles of the invention is shown in Figs. 4 and 5, wherein the hand bar 22b is projected from a position above the head 9b of the bed, not by swinging arms 23b about a fixed axis, but, instead, by raising the lower ends of the arms 23b while causing intermediate pivots 27 on the arms 23b to swing in arcuate paths, guided by links 26 which are pivoted to the pivots 27 and to pivots 28 on the head 9b. The hand bar 22b and side arms 23b constitute a yoke which, in the inoperative position of the trapeze, conforms generally to the marginal contour of the head 9b. The lower ends of the arms 23b have pivoted connections 24 with track slots 25 in the side edges of the head 9b. For moving the trapeze, I provide a motor 45b which drives the transverse shaft 29 through reduction gearing 30.

Shaft 29 is journalled in bearing brackets 31 secured to the fixed frame of the bed (for example to the head 9).

Secured to the ends of the shaft 29 are a pair of arms 32, which are adapted to swing from the depending positions shown in dotted lines in Fig. 4 to upwardly extending positions shown in full lines in Fig. 4. The ends of the arms are connected through links 33 to the lower ends of the arms 23b.

Normally the trapeze will be disposed in a position in which the hand bar 22b extends along the upper edge of the head 9b and the arms 23b extend downwardly along the side edges of the head 9b. The arms 23b are accommodated in the spaces 21 between the panels 19 and 20 and the bed section C (Fig. 7).

Operation of the motor 45b (which is a reversible motor) to swing the arms 32 counter-clockwise from the dotted line positions to the full line positions shown in Fig. 4 will move the lower ends of the arms 23b upwardly, causing the arms 26b to swing upwardly about their pivots 28.

As the trapeze thus moves upwardly, the lower ends of the arms 23b will track in the slots 25 and the hand bar 22b will be projected toward the foot of the bed to the position shown in full lines in Fig. 4. In this projected position, the hand bar 22b will be supported by the arms 26, acting in tension, and the arms 23b, acting in compression, and the weight of a patient may be imposed upon the hand bar 22b.

A variation of the general arrangement of Figs. 4 and 5 is shown in Figs. 6 and 7. Fig. 6 also serves to disclose the approximate position of the hand bar 22c with relation to the bed bottom sections C, D, E, in their reclining positions. The relative positions of the hand bar and the bottom sections are substantially the same in all forms of the invention in order that the weight of the patient's body may be substantially centered beneath the hand bar when the patient is in the reclining position provided by the sections in their raised positions. In this form of the invention, the side arms 23c of the trapeze are hinged upon studs 24 extending laterally from follower nuts 61 which travel upon threaded shafts 62 and within channel shaped sheaths 63 that are secured to the head of the bed. Links 26, arranged similarly to those shown in Fig. 4, connect the intermediate regions of the side arms 23 to the upper corners of the head 9. At the lower ends of the sheaths 63 are gear casings 64 in which worm gears 65 on the lower ends of the shafts 62 are meshed with worms 66 on a shaft 67 which is driven by an electric motor 68. The studs 24 extend through slots 69 in the sides of the sheaths 63.

Operation of the motor 68 causes the nuts 61 to travel vertically on the shafts 62. The motor 68 is a reversible motor so that the nuts 61 may be driven either upwardly or downwardly to project or retract the trapeze.

In the retracted position the trapeze lies adjacent to the inner face of the head 9c of the bed. The projected position is shown in Fig. 6.

As shown in Fig. 6, the bed bottom includes leg and thigh sections E and D hinged to each other at 75, and a back rest section C hinged at 76 to the thigh section and to the sub frame 16 and fixed frame rails 11' and 11''.

Mechanism for elevating the back sections C and the thigh sections D may include a pair of arms 78 and 79 having rollers 80 engaging the undersides of the sections D and C and mounted upon shafts 81 and 82 which are suspended beneath the fixed frame 18. Secured to the respective shafts 81 and 82 are arms 83 and 84 which extend downwardly. Screw jacks units 85 and 86 are connected at their respective ends to the arms 83 and 84 and to the frame 18, and are driven by reversible electric motors 87 to move the arms 78, 79 upwardly or downwardly. In their lowered positions the arms 78, 79 lie below the plane of translational movement of the removable bed section so as not to interfere with such removal.

Another arrangement incorporating the principles of the invention is disclosed in Figs. 9 and 10. In this arrangement, the hand yoke includes a trapeze bar 22d, having side arms 23d that are provided with rack teeth 91.

The arms 23d are of arcuate, segmental, circular form, and are mounted for circumferential movement between drive pinions 92 and guide rollers 93 and 94 in the head 9d of the bed. In the retracted position of the trapeze, the arms 23d are substantially entirely enclosed within the head 9d, and occupy the positions indicated in dotted lines. In the projected position shown in full lines in Fig. 9, the arms 23d are supported at the lower ends between the rollers 93 and 94 and the pinions 92. Rollers 71, mounted in forks in the lower ends of the arms 23d, may be arranged to roll upon arcuate tracks 72 in the head 9d, to aid in supporting the trapeze for smooth movement in its lower positions.

The drive pinions 92 are mounted upon a common shaft 95 which is driven from a motor 96 through reduction gearing 97 shown in dotted lines in Fig. 10.

One of the advantages of this form of the invention is the fact that the side arms of the trapeze are substantially completely housed in the retracted position of the trapeze. Since the head 9d must have considerable depth from front to rear in order to accommodate the arcuate arms 23d, the extra space within the head 9d may be utilized to accommodate cabinets 98 having doors 99 hinged at 100 to permit access to the cabinets by the patient occupying the bed.

Referring now to Figs. 11 to 14 inclusive, the bed lamp 102 comprises a tubular casing 103, generally triangular in shape, having its ends secured in caps 104 which are provided with sockets 105 in which the ends of the trapeze arm portions 101, extending toward each other in axial alignment, are journaled and secured by trunnions 106. Coil springs 107 are interposed, under compression, between heads 108 on the ends of the trunnions 106, and sockets 109 in end members 110 that are secured to the caps 104. The springs 107 provide yielding frictional clutching connections which permit the lamp to be adjusted to various positions about the axis of the trunnions 106, and function to retain the lamp in any adjusted position.

Between the caps 104 is a pair of intermediate partitions 111. Between the partitions 111 and the end members 110 are defined reading lamp chambers 112 and 113. Between the partitions 111 is defined an ultraviolet lamp chamber 114. In sockets 115 carried by the end members 110 and partitions 111 respectively, are mounted fluorescent lamp units 120. Between the partitions 111, on brackets 117 secured thereto, is mounted an ultraviolet lamp unit 118. Below the ultraviolet lamp unit 118 the casing 103 is provided with an opening 119 to permit the ultraviolet rays to pass, unimpeded, downwardly upon the body of a patient. The rays from the reading lamp units 120 pass through the end portions of the window 116, which is formed of a translucent, plastic material capable of transmitting the rays.

Figure 15:
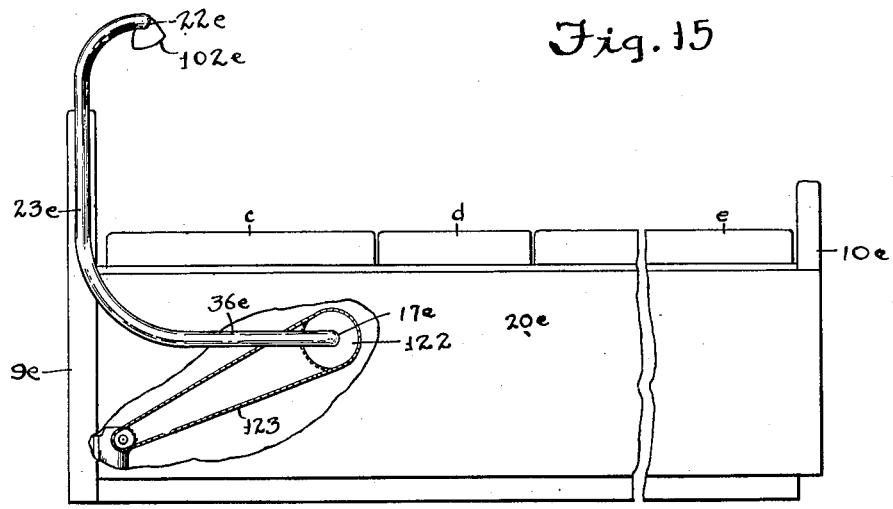
Fig. 15 is a side view of another modification of the invention.
Figure 16:
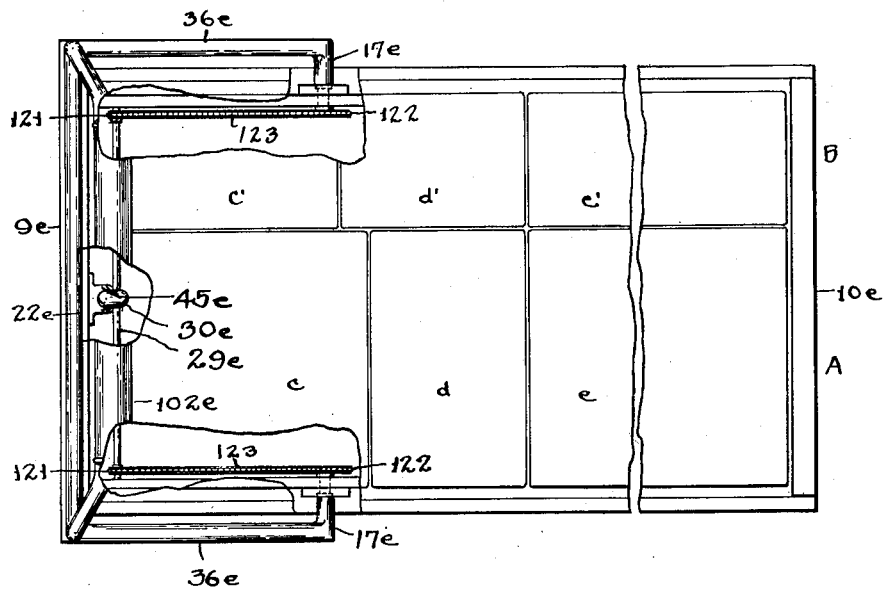
Fig. 16 is a plan view of the same.

In Figs. 15 and 16 I have shown an arrangement similar to that of Figs. 1 and 2, with the exception that both ends of the trapeze arms 36e are driven. The drive mechanism includes a motor 45e, reduction gearing 38e, a shaft 29e, sprockets 121 on the shaft 29e, aligned sprockets 122 on the trunnions 17e, and chains 123 connecting the sprockets 121 and 122. This arrangement leaves the space between the sprockets 122 clear so as to avoid interference with the toilet mechanism, while providing a drive to both ends of the trapeze.

In Figs. 15 and 16, parts corresponding to similar parts in other figures are referred to by the same numerals, with the letter e attached in most cases.

I claim as my invention:

1. In a bed, a fixed frame including a head and a foot, a trapeze including a hand bar and a pair of side arms forming together with said hand bar a substantially inverted U-shaped yoke, and means attaching said yoke to said fixed frame with said hand bar extending transversely of the bed, for movement from an inoperative position wherein said hand bar is positioned adjacent the upper edge of said head and said side arms extend along the side extremities of said head, to a position in which said hand bar is projected toward the foot of the bed from said head and spaced above the bed, said means including means for supporting the yoke in the latter position so that the weight of a patient may be imposed upon said hand bar in its projected position.

2. In a bed, a fixed frame including a head and a foot, a yoke-shaped trapeze including a hand bar and a pair of side arms, means connecting said trapeze to said fixed frame with said hand bar positioned transversely of the bed, for movement from an inoperative position wherein said hand bar extends along the upper edge of said head to a position wherein said hand bar is projected toward the foot of the bed and spaced above the bed, and reversible motor driven means for moving said trapeze between said inoperative and projected positions and for supporting the trapeze in the projected position so that the weight of a patient may be imposed upon said hand bar.

3. In a bed, a fixed bed frame including a head and a foot, a yoke-shaped trapeze including a hand bar adapted to normally assume an inoperative position lying alongside said head and a pair of side arms; track means disposed adjacent the side extremities of said head, means operating in said track means and attaching the lower ends of said side arms to said head for vertical movement along the side extremities thereof; a pair of arms each pivoted at one end to one of the upper corners of said head and at its other end to an intermediate portion of a respective side arm, and reversible motor-driven means for applying raising and lowering movements to the lower ends of said side arms whereby to project said hand bar toward the foot of the bed from said head and to retract said hand bar back to said inoperative position.

4. In a bed, a fixed frame including a head and a foot, a trapeze including a hand bar and means connecting said trapese to said fixed frame with said hand bar disposed transversely of the bed, for bodily arcuate movement, about an axis transverse to the bed, from an inoperative position wherein said hand bar lies adjacent said head to a position wherein said hand bar is spaced above the bed and lies intermediate the head and foot of the bed.

5. A bed as defined in claim 4 including reversible motor means for moving said trapeze between said inoperative and projected positions.

6. In a bed, a fixed bed frame, a trapeze including a hand bar and a side arm, and means connecting said trapeze to said fixed bed frame for movement from a position wherein said trapeze is disposed with said hand bar and said side arm lying alongside respective members of said fixed frame, to a position wherein said hand bar is disposed above the bed and intermediate the head and foot of the bed.

7. In a bed, a fixed frame including a head and a foot, a trapeze including a hand bar and a side arm, and means cooperating with said side arm to attach said trapeze to said fixed frame for movement of the trapeze from an inoperative position wherein said hand bar lies along a horizontal upper edge of said head portion and said side arm lies alongside a horizontal part of said fixed frame, to a projected position wherein said hand bar is spaced above the bed and intermediate said head and the foot of the bed, with said hand bar at all times disposed transversely of the bed.

8. In a bed, a fixed frame including a head and a foot and a horizontal frame structure, a yoke-shaped trapeze including a hand bar and a side arm, an end of said side arm being pivoted to said horizontal frame structure for movement of said trapeze from an inoperative position wherein said hand bar lies adjacent said head and said side arm lies alongside said horizontal frame structure to a projected position wherein said hand bar is spaced above the bed and lies intermediate the head and the foot of the bed, with said hand bar at all times disposed transversely of the bed; and motor means for moving said trapeze between said inoperative and projected positions.

9. In a bed, a fixed frame including a head, a foot and horizontal side frame members, a yoke-shaped trapeze including a hand bar and a side arm of L-shape, an end of said side arm being pivoted to one of said side frame members for movement of said trapeze between an inoperative position wherein said hand bar lies adjacent the upper edge of said head, with a portion of said side arm lying alongside a side edge of said head and another portion of said side arm lying alongside said one horizontal longitudinal frame member, to a projected position wherein said hand bar is spaced above the bed and lies intermediate said head and the foot of the bed; and motor means for moving said trapeze between said inoperative and projected positions.

10. A bed as defined in claim 8 wherein said motor means includes a reversible electric motor anchored to said fixed frame, a screwjack operated by said motor, a shaft journalled in said fixed frame and extending transversely of the bed, and an arm secured to said shaft and linked to said screwjack, said trapeze arm being secured to an end of said shaft.

11. In a bed, a fixed frame including a head and a foot, a side panel and a longitudinal rail spaced inwardly from said side panel and joined to said head, a yoke-shaped trapeze including a hand-bar and a side arm, said side arm being accommodated in a space between the side panel and said rail, and means connecting said side arm to said fixed frame for movement of said trapeze from a position wherein said hand bar lies adjacent the head of the bed and said side arm lies adjacent said side panel, to a projected position wherein said hand bar is spaced above the bed and lies intermediate the head and the foot of the bed.

12. In a bed, a fixed frame including a head and a foot, a trapeze including a hand bar and means connecting said trapeze to said fixed frame with said hand bar positioned transversely of the bed for movement from an inoperative position wherein said hand bar lies parallel and adjacent to the upper edge of said head to a position wherein said hand bar is spaced above the bed, intermediate the head and foot thereof.

13. In a bed, a fixed frame including a head, a trapeze including a hand bar and reversible motor driven means for moving said trapeze between an inoperative position, wherein said hand bar lies alongside a member of said fixed frame, and a projected position, wherein said hand bar is spaced above the bed and extends transversely thereof and for supporting the trapeze in the projected position so that the weight of a patient may be imposed upon said hand bar.

14. In a bed, a fixed frame including a head, a trapeze including a hand bar, electric motor means for moving said trapeze between an inoperative position, in which said hand bar lies alongside a member of said fixed frame, and a projected position, in which said hand bar is spaced above the bed and extends transversely thereof, and limit switch mechanism for automatically deenergizing said motor means at the limits of projecting and retracting movements.

15. In a bed, a fixed frame including a hollow head, a trapeze of yoke shape including a hand bar and a pair of arcuate side arms depending from said hand bar and formed with ratchet teeth, said side arms being normally accommodated within said hollow head, and drive mechanism within said hollow head including pinions meshing with said ratchet teeth for projecting said trapeze forwardly from said head portion.

16. In a bed, a fixed frame including a hollow head, a trapeze of yoke shape including a hand bar and a pair of arcuate side arms depending from said hand bar and formed with ratchet teeth, said side arms being normally accommodated within said hollow head, and guide roller means cooperating with said side arms to support said trapeze in its projected position and facilitate the movement of the trapeze.

17. A bed as defined in claim 8, wherein said motor means is disposed closely adjacent one end of the bed, and includes a drive shaft extending along said end of the bed to a side thereof and drive transmitting means extending from the end of said shaft along the aforesaid side of the bed to the pivoted end of said side arm and drivingly connected thereto.

MARVEL D. BEEM.

REFERENCES CITED

The following references are of record in the file of this patent:

UNITED STATES PATENTS

| Number | Name | Date |
|---|---|---|
| 522,342 | Helander | July 3, 1894 |
| 826,978 | Whittington | July 24, 1906 |
| 892,817 | Feely | July 7, 1908 |
| 1,298,362 | Lewry | Mar. 25, 1919 |
| 1,840,170 | Neils | Jan. 5, 1932 |
| 2,057,811 | Armstrong | Oct. 20, 1936 |
| 2,245,331 | Dawley | June 10, 1941 |
| 2,406,480 | Tratsch | Aug. 27, 1946 |

FOREIGN PATENTS

| Number | Country | Date |
|---|---|---|
| 122,878 | Switzerland | Oct. 1, 1927 |